United States Patent
Sharifi

(10) Patent No.: US 9,435,878 B1
(45) Date of Patent: *Sep. 6, 2016

(54) POSITIONING USING AUDIO RECOGNITION

(71) Applicant: Google Inc., Mountain View, CA (US)

(72) Inventor: Matthew Sharifi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/488,858

(22) Filed: Sep. 17, 2014

Related U.S. Application Data

(63) Continuation of application No. 13/553,735, filed on Jul. 16, 2012, now Pat. No. 8,868,223.

(51) Int. Cl.
*G06F 17/00* (2006.01)
*G01S 5/24* (2006.01)

(52) U.S. Cl.
CPC ....................... *G01S 5/24* (2013.01)

(58) Field of Classification Search
USPC ........................................... 700/94; 704/251
See application file for complete search history.

(56) References Cited

U.S. PATENT DOCUMENTS

| | | |
|---|---|---|
| 8,726,400 B1 | 5/2014 | Granstrom et al. |
| 2013/0085846 A1 | 4/2013 | Galarneau |
| 2013/0097630 A1 | 4/2013 | Rodriguez |
| 2013/0169838 A1 | 7/2013 | Rodriguez et al. |
| 2014/0007162 A1 | 1/2014 | Harrison |

OTHER PUBLICATIONS

Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.
Notice of Allowance for U.S. Appl. No. 13/553,735, dated Jun. 19, 2014, 20 pages.

*Primary Examiner* — Creighton Smith
(74) *Attorney, Agent, or Firm* — Fenwick & West LLP

(57) ABSTRACT

Systems and methods for determining location based on audio fingerprinting are disclosed. An extraction component extracts a set of interest points from an audio signal associated with an audio announcement. Then a matching component determines if the extracted set of interest points matches a set of interest points representative of an audio fingerprint in a data store comprising audio fingerprints. In an aspect, the audio fingerprints in the audio fingerprint data store represent announcements for underground transportation systems. A location component further determines location information associated with the audio fingerprint based in part on the set of extracted interest points matching the set of audio interest points representative of the audio fingerprint in the data store.

20 Claims, 10 Drawing Sheets

600

EXTRACTING A SET OF INTEREST POINTS FROM AN AUDIO SIGNAL ASSOCIATED WITH AN AUDIO ANNOUNCEMENT  602

DETERMINING IF THE EXTRACTED SET OF INTEREST POINTS MATCHES A SET OF INTEREST POINTS REPRESENTATIVE OF AN AUDIO FINGERPRINT IN A DATA STORE COMPRISING AUDIO FINGERPRINTS  604

DETERMINING LOCATION INFORMATION ASSOCIATED WITH THE AUDIO FINGERPRINT BASED IN PART ON THE SET OF EXTRACTED INTEREST POINTS MATCHING THE SET OF AUDIO INTEREST POINTS REPRESENTATIVE OF THE AUDIO FINGERPRINT IN THE DATA STORE  606

FIG. 6

POSITIONING USING AUDIO RECOGNITION

CROSS-REFERENCE TO RELATED APPLICATIONS

This application is a continuation of U.S. patent application Ser. No. 13/553,735, filed Jul. 19, 2012, and entitled, "POSITIONING USING AUDIO RECOGNITION," the entirety of which is incorporated herein by reference.

TECHNICAL FIELD

This disclosure relates to determining position using audio recognition of pre-defined audio fingerprints provided in a data store.

BACKGROUND

Most modern portable devices, such as smartphones, have built in global positioning system (GPS) capabilities which facilitate a variety of location based applications. One problem with most widespread location systems including GPS, cellular identification (ID) and wireless fidelity (WiFi) based location systems, is that they cannot function in underground transportation systems because there is no access to a GPS satellite or a mobile network. However, users of underground transportation systems would greatly benefit from knowledge of their location, especially when traveling in unfamiliar cities. For example, knowledge of their precise underground location can facilitate route planning and forewarn users of train stops at which they should depart. Most conventional solutions for enabling underground location systems involve large installations of hotspots throughout the transportation system. Such solutions are costly and inefficient.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with determining location based on audio fingerprinting.

In accordance with a non-limiting embodiment, in an aspect, a system is provided comprising an extraction component that extracts a set of interest points from an audio signal associated with an audio announcement and a matching component that determines if the extracted set of interest points matches a set of interest points representative of an audio fingerprint in a data store comprising audio fingerprints. The system further comprises a location component that determines location information associated with the audio fingerprint based in part on the set of extracted interest points matching the set of audio interest points representative of the audio fingerprint in the data store. In an aspect, the audio fingerprints in the data store correspond to respective underground transportation system announcements.

In accordance with another non-limiting embodiment, a method is provided comprising extracting a set of interest points from an audio signal associated with an audio announcement and determining if the extracted set of interest points matches a set of interest points representative of an audio fingerprint in a data store comprising audio fingerprints. The method further includes determining location information associated with the audio fingerprint based in part on the set of extracted interest points matching the set of audio interest points representative of the audio fingerprint in the data store.

In another non-limiting embodiment, a device is provided comprising means for extracting a set of interest points from an audio signal associated with an audio announcement. The device can further comprise means for determining if the extracted set of interest points matches a set of interest points representative of an audio fingerprint in a data store comprising audio fingerprints; and means for determining location information associated with the audio fingerprint based in part on the set of extracted interest points matching the set of interest points representative of the audio fingerprint in the data store.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

BRIEF DESCRIPTION OF THE DRAWINGS

FIG. 6 illustrates an example methodology for determining location via audio fingerprinting in accordance with various aspects and implementations described herein.

DETAILED DESCRIPTION

Figure 1:
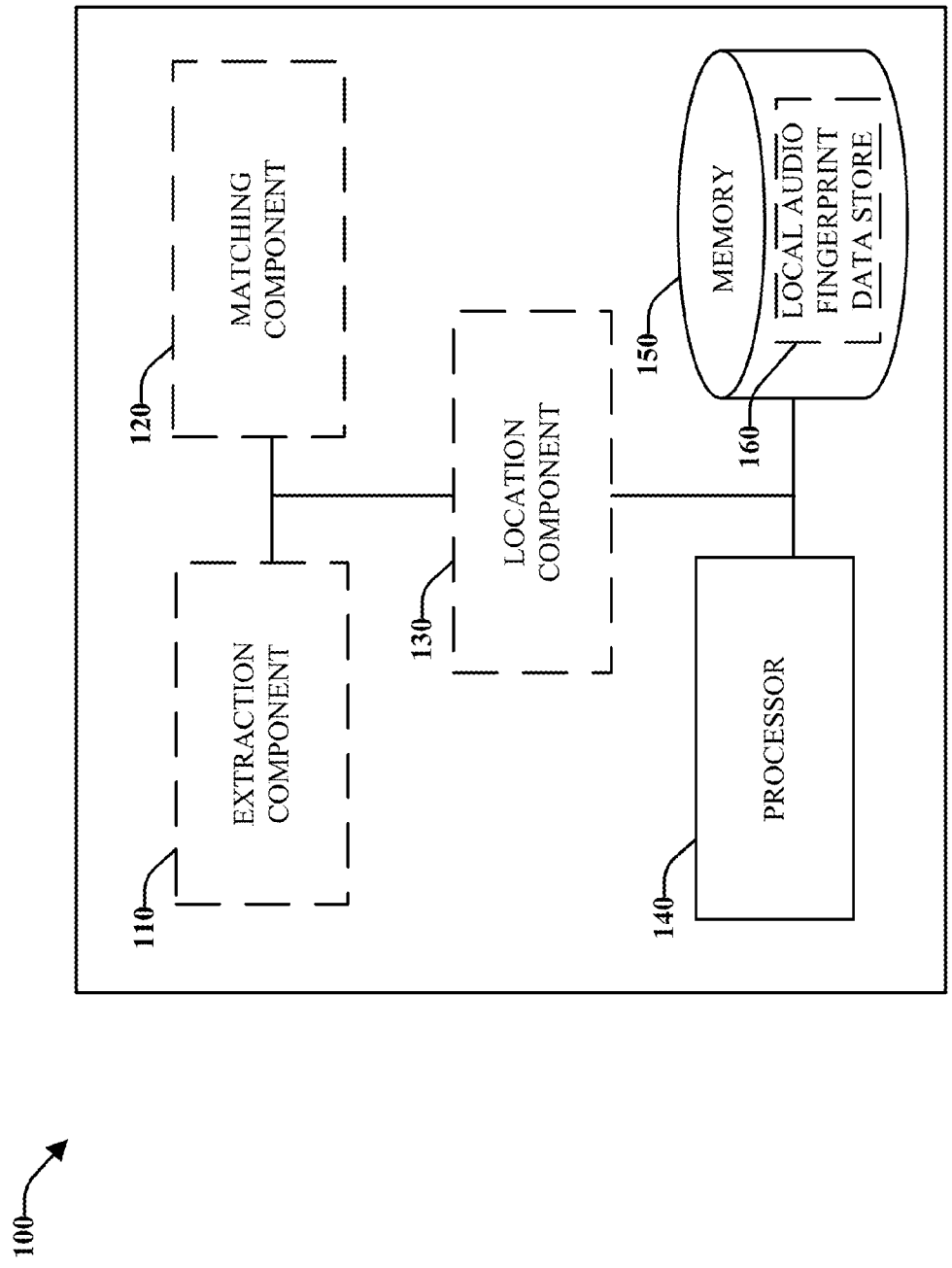
FIG. 1 illustrates an example non-limiting locating system that facilitates determining location via audio fingerprinting in accordance with various aspects and implementations described herein.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring now to the drawings, with reference initially to FIG. 1, a locating system 100 that facilitates determining location based on audio is presented. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 150 for storing computer executable components and instructions. A processor 140 can facilitate operation of the computer executable components and instructions by the system 100.

System 100 receives and processes audio announcements to facilitate determining location. In particular, system 100 correlates an automated audio announcement, such as an audio announcement of an underground transportation system, with locally held location information to facilitate determining location where a device does not have access to GPS satellites and/or a cellular network. In an embodiment, system 100 employs an extraction component 110, a matching component 120, and a location component 130. In an aspect, extraction component 110 extracts a set of interest points from an audio signal associated with an audio announcement. Then matching component 120 determines if the extracted set of interest points matches a set of interest points representative of an audio fingerprint in a data store comprising audio fingerprints. Location component 130 can then determine location information associated with the audio fingerprint based in part on the set of extracted interest points matching the set of audio fingerprints representative of the audio fingerprint in the data store.

Underground transportation systems, such as subway systems and the like, generally employ automated audio announcements to provide routine information to passengers. For example, underground transportation systems may provide pre-recorded automated audio announcements at various train stops to indicate the name of the stop. For example, a typical announcement may state "now arriving at Grand Central Station." System 100 employs a local audio fingerprint data store 160 comprising audio fingerprints corresponding to audio announcements, such as announcements of underground transportation systems. The audio fingerprints in the local audio fingerprints data 160 store can further be associated with location information. For example, the location information can include a street address, intersection, an/or GPS location.

In an aspect, system 100 is employed with a client device. A client device can include any suitable computing device associated with a user and configured to extract audio information from audio. For example, a client device can include a desktop computer, a laptop computer, a smartphone, a tablet personal computer (PC), or a PDA. In an aspect, system 100 is generally employed in a portable client device, such as a smart-phone, that a user can carry while traveling in an underground transportation system. As used in this disclosure, the terms "consumer" or "user" refer to a person, entity, system, or combination thereof that employs locating system 100 (or additional systems described in this disclosure). In an aspect, a client device and/or locating system 100 (or additional systems described in this disclosure) can be configured to access, transmit and/or receive media content via a network such as for example the Internet, intranet, or cellular service.

In one embodiment, local audio fingerprint data store 160 can comprise transcriptions of full copies or distinguishing clips of audio announcements of underground transportation system. For example, an audio announcement may be distinguishable from other announcements by a single word or phrase. Thus a transcription for such an audio announcement may only include the distinguishing word or phrase. The audio announcement transcriptions can further be associated with location information. In general, the number and total size of audio announcements for a given transportation system can be relatively small for storage at a client device. For example, the London Underground has less than 300 stations and with audio announcements for each station being about a few seconds long, (e.g. between about 1 second and about 15 seconds long). Accordingly, the transcriptions for each of the announcements of a given transportation system can be resourcefully provided in local audio fingerprint data store.

According to this embodiment, a client device employing system 100 can use speech recognition software to identify an audio announcement heard while traveling in an underground transportation system. For example, extraction component 110 can include a microphone to listen for audio announcements. Extraction component 110 can further employ speech analysis software to identify the speech of a given announcement. In turn, matching component 120 can match the speech of an identified audio announcement to an audio announcement transcription held in data store 160 and location component 130 can determine location information associated with the announcement based in part on the match. For example, the location information can be associated with the audio announcement in data store 160 and include a street address, intersection, an/or GPS location.

However, in another embodiment, rather than storing actual transcriptions of audio announcements, local audio fingerprint data store 160 can store audio fingerprints of the audio announcements. As used herein, an audio fingerprint is a unique, highly compact set of digital interest points generated by an audio signal that can be used to identify an audio sample, such as an automated underground transportation system announcement. An audio fingerprint is computed for an audio sample by first taking the (Fast Fourier Transforms (FFTs) of overlapping windows of audio signals of the audio sample and constructing a spectrogram (e.g. a time frequency plot). Then a set of stable interest points in the spectrogram are selected. The selected set of interest points are points which are the local maxima in a certain time/frequency window. The resulting fingerprint consists of the selected set of interest points. The interest points each have a frequency and time component. Audio fingerprints are compact when compared to full audio clips. For example, a five second audio announcement can have approximately a 100 byte fingerprint. Accordingly, fingerprints for an entire transportation system having 300 stops and 300 respective announcements can be stored in less than 30 Kilobytes. Therefore, it is feasible for local fingerprint data store 160 to be provided on client device and store fingerprints for multiple underground transportation systems. One advantage of using audio fingerprinting as opposed to speech recognition and transcription matching is that audio fingerprinting is more robust to external noise, which can be prevalent in underground transportation environments.

Extraction component 110 is configured to detect and extract audio fingerprints from audio announcements. In particular, extraction component 110 extracts a set of interest points from an audio signal associated with an audio announcement. Extraction component 110 can employ a microphone to continuously listen for audio announcements in ambient audio. When the extraction component 110 detects an audio announcement, the extraction component 110 performs audio fingerprinting of the detected audio announcement. In an aspect, the extraction component 110 performs audio fingerprinting upon the detection of any ambient noise. The extraction component 110 extracts audio fingerprints from audio in real-time or near real time so that interest points can be processed at the time they are detected.

In order to perform audio fingerprinting of detected audio the extraction component 110 first takes the (Fast Fourier Transforms (FFTs) of overlapping windows of audio signals of the audio sample and constructs a spectrogram (e.g. a time frequency plot). Then the extraction component 110 selects a set of stable interest points in the spectrogram. In an aspect, the selected interest points can include the local maxima in a certain time/frequency window.

In another aspect, the extraction component 110 continuously extracts interests points from the audio signal and groups the interests points into one or more sets as a function of a predetermined window of time. In an aspect, the predetermined window of time can account for the average duration of a transportation system announcement for which a fingerprint has been taken and provided in local fingerprint data store 160. In another aspect, the predetermined window of time can correspond to the maximum duration of an announcement for which a fingerprint is provided for in a data store 160. For example, the predetermined window of time may be between about one and about ten seconds. The resulting sets of interest points can include one or more interest points, where some sets may include common or overlapping interest points. For example where a predetermined window of time is five seconds, a first set can be determined from a window of time from seconds 1-5 and include interest points (f1, t1), (f2, t2), and (f3, t3), while a second set can be determined from a window of time from seconds 2-6 and include interest points (f2, t2), (f3, t3), and (f4, t4).

Matching component 120 matches extracted audio fingerprints to audio fingerprints stored in local fingerprint data store 160. In particular, matching component 120 determines if an extracted set or subset of interest points matches a set of interest points representative of an audio fingerprint in local fingerprint data store 160. For example, the matching component 120 can employ sets of audio fingerprints in audio data store which correspond to known announcement and perform a pair-wise comparison of an extracted set of audio interest points to each of the sets of audio fingerprints corresponding to known announcements. In other words, the matching component will match a set of interest points which correspond to the captured audio to another set which correspond to the announcement as stored in audio fingerprint data store. In an aspect, an extracted set of interest points includes each of the interest points in a set of interest points for a known/stored announcement. In another aspect, an extracted set of interest points includes a subset of the interest points in a set of interest points for a known/stored announcement. The matching component 120 can determine if an extracted set of audio fingerprints matches a set of audio fingerprints for a known/stored audio announcement by using a measure of interest point overlap. For instance, the matching component can overlay the two sets of interest points (an more particularly the extracted set of interest points with each of the sets of interest points in the audio fingerprint data store 160) at various time shifts to determine if an overlap between the interest points of the two sets is achieved. In an aspect, an overlap is achieved when each of the interest points in an extracted set overlap with interest points in stored set.

The matching component 120 continuously performs matching of detected sets of interest points or fingerprints against those fingerprints stored in local fingerprint data store 160. In an aspect, the matching component 120 performs matching of detected audio fingerprints to audio fingerprints in local fingerprint data store in real-time or near real-time. Where the extraction component continuously extracts interests points from an audio signal and groups the interests points into one or more sets as a function of a predetermined window of time, the matching component 120 determines if the one or more sets matches a set of interest points representative of an audio fingerprint in the data store 160. In other words, the matching component 120 can perform matching of detected interest points detected under a fixed window of time, (e.g. five seconds) in real-time or near real time.

Location component 130 determines location information associated with a detected audio fingerprint when the matching component 120 determines a match. In particular, the location component 130 determines location information associated with an audio fingerprint based in part on a set of extracted interest points matching a set of audio interest points representative of an audio fingerprint in the data store 160. For example, audio fingerprints in local audio fingerprint data store 160 can be associated with metadata that includes location information. For example, the location information can indicate, city, a town, a street address, an intersection, and/or a GPS location. The location information can also include information about train connections along with information about a current stop and a following stop. The location component 130 can further provide the location information to a user. For example, as a user is approaching a subway stop, the subway system may announce, "Grand Central Station, next stop Times Square." According to this example, in response to detection and matching of an audio fingerprint of the announcement to an audio fingerprint stored in local audio fingerprint data store, the location component 130 may provide a user with a textual message comprising location information associated with the current stop and the following stop.

Figure 2:
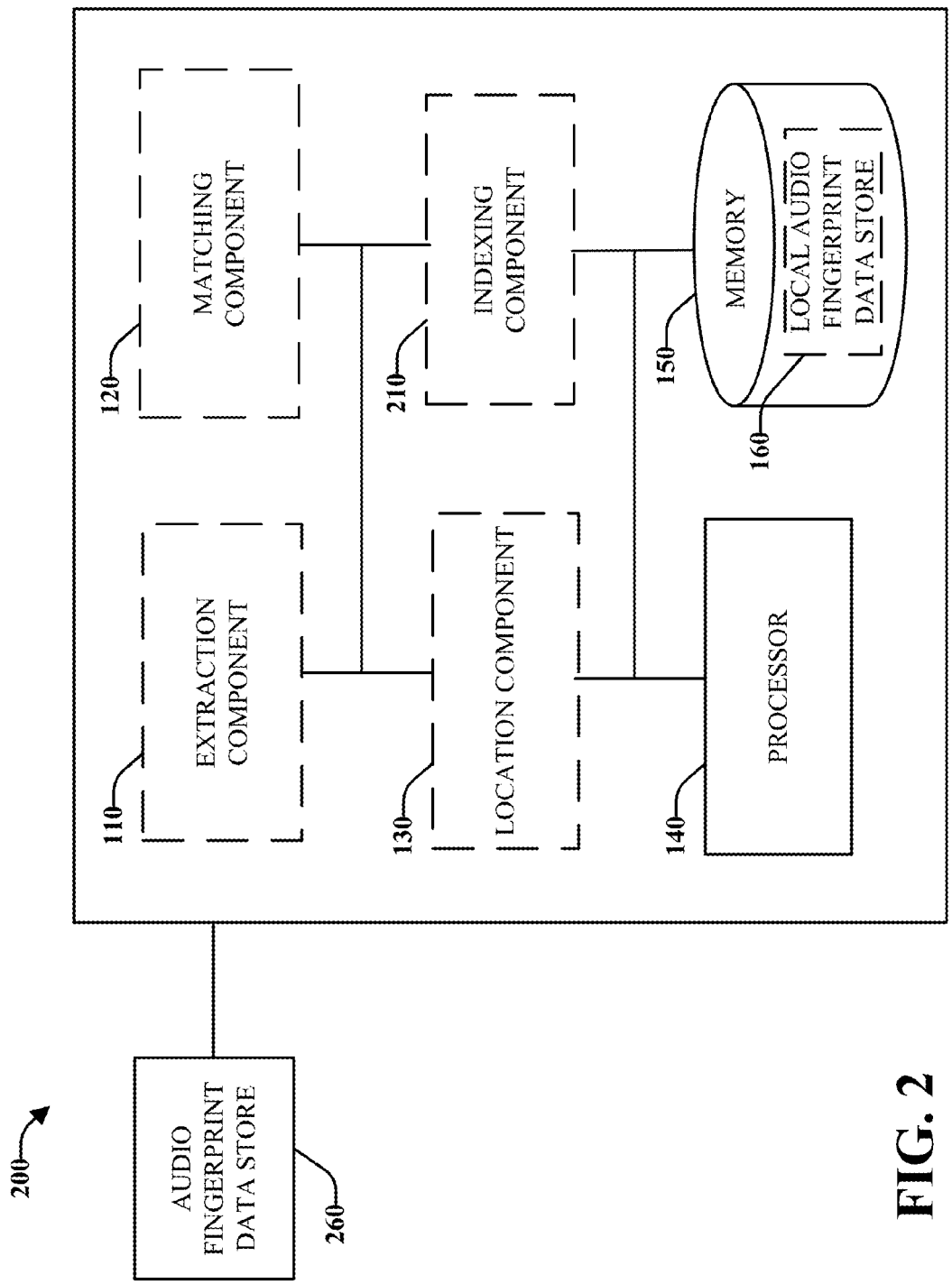
FIG. 2 illustrates an example of another non-limiting locating system that facilitates determining location via audio fingerprinting in accordance with various aspects and implementations described herein.

With reference to FIG. 2, presented is another exemplary non-limiting embodiment of locating system 200 that facilitates determining location via audio fingerprinting in accordance with the subject disclosure. System 200 can include indexing component 210 to facilitate indexing fingerprints stored in local fingerprint data store 160. In particular, indexing component 210 generates a reference index of the audio fingerprints in local audio fingerprint data store 160. The index is an inverted index that maps a frequency bin to a fingerprint identifier and a time component. The fingerprint identifier can include an identification name or number, such as Fingerprint One (fp1). The time component can represent a time in which an interest point for is detected, such as Time 1 (t1). The creation of the local inverted index of the fingerprints in local audio fingerprint data store by indexing component 210 facilitates efficient real-time matching of extracted audio fingerprints. As a result, the subject locating system is highly compact, resistant to noise, and can easily be scaled to large networks or transportation systems.

In particular, the subject locating systems are designed to facilitate determining location with a personal device, such as a smartphone, under the constraints that the device which wishes to be geolocated has no access to a mobile network. As a result, information required to perform the geolocation when underground must be held locally. In an aspect, local audio fingerprint data store 160 comprises a database of audio fingerprints associated with location information. However, in another aspect, the indexing component 210 further organizes the audio fingerprints stored in the local audio fingerprint data store into a compact form. Not only does the reference index enable efficient real-time or near real time matching, the reference index requires minimal storage memory resources. As a result, a client device can store multiple reference indexes for multiple transportation systems with minimal effect on device storage and performance capabilities.

In view of the above, in an embodiment, system 200 can include audio fingerprint data store 260 that can be located remote from a client device in which data store 160 is employed. For example, audio fingerprint data store 260 can be located in cloud-based memory and accessed by a client device via a network such as for example the Internet, intranet, or cellular service. In an aspect, audio fingerprint data store 260 can store the same information as local audio fingerprint data store 160. In another aspect, local audio fingerprint data store 160 can store a subset of the information held in audio fingerprint data store.

For example, audio fingerprint data store 260 can store multiple sets of audio fingerprints, each of the sets corresponding to a different underground transportation systems. In an aspect, local audio fingerprint data store 160 receives its information, including the audio fingerprints stored therein, by downloading the information from audio fingerprint data store 260 when the device is not underground. For example, audio fingerprint data store 260 can serve as a master data store comprising the audio fingerprint database sets for multiple underground transportation systems, such as every underground transportation system in the world. In turn, a user of a client device employing system 200 can download from data store 260, one or more of the sets of the audio fingerprints for the transportation systems that the user intends to travel on. The downloaded sets of audio fingerprints can be stored locally in data store 160 on the client device.

A device employing system 200 can download any number of sets of audio fingerprints. In an aspect, the user of a device can select the transportation systems for which they wish to download sets of audio fingerprints from audio fingerprint data store 260 into memory 160. For example, a user of a device may only use a single underground transportation system and thus only choose to download the set of audio fingerprints for that transportation system. In another aspect, a device employing system 200 may download every set of audio fingerprints held in data store 260 to store locally in data store 160.

For example, in response to receiving a set of audio fingerprints in local audio fingerprint data store 160, the indexing component 210 generates an index for the set of audio fingerprints. The index is further stored in memory 150 and/or local audio fingerprint data store 160. In order to generate the index, in an aspect, a device employing system 200 will first load a database set of fingerprints for a given transportation system into memory. The database comprises fingerprints, each of which are identified by a set of interest points comprising a time component and a frequency component associated with a spectrogram. The indexing component then transforms the database and transform it into an inverted index, structured as follows:

input fingerprint id 1 (fp1), consisting of 4 interest points:
point1: (f1, t1);
point2: (f2, t2);
point3: (f3, t3);
point4: (f2, t4);
output index:
f1→fp1: t1
f2→fp1: t2, t4
f3→fp1: t3

The inverted index maps from a frequency bin to the fingerprint ID and the time at which the interest point was detected. Once the index has been constructed and when positioning is enabled, the extraction component 110 performs fingerprinting by detecting and extracting fingerprints. The extraction component 110 performs the fingerprinting in real-time so that matching component 120 and location component 130 can process the interest points as soon as they are detected. The subject fingerprinting scheme is lightweight and creates minimal load on a modern smartphone.

Geolocation can then be performed by matching component 120 by matching extracted fingerprints against the reference index audio fingerprint announcements. The matching process is somewhat standard (e.g. histogram of a projection on x=y). What is important is that the matching is continuous and only considers a fixed size window (e.g. 5 seconds). Each time a new interest point is detected be extraction component 110 in the signal captured from the microphone, the matching component 120 takes its frequency band and looks it up in the reference index, which is keyed by frequency bin. Any reference fingerprint which is matched is treated as a potential candidate. For example, assuming the matching component 120 looked up (f_probe, t_probe) and found matches in reference fingerprint ID 10 at time_100 and time_150, the matching component 120 will add two entries to a projection histogram for reference fingerprint ID 10 as follows:

t_probe−time_100
t_probe−time_150 where f_probe and t_probe are frequency and time components of an extracted interest point in an associated spectrogram.

In turn, the matching component 120 scans through the histogram and if it finds a peak that is above a predetermined threshold, then the matching component 120 will declare reference fingerprint ID 10 as a match. The matching is continuous in the sense that, at any given time, the matching component 120 is only matching a window of x seconds. This constraint is implemented by removing histogram entries once t_current−t_probe exceeds the window width in seconds, where t_current represents a current time. Once the matching component 120 has identified a matched reference, the location component 130 can look at the location information associated with the matched reference fingerprint to provide location information.

Figure 3:
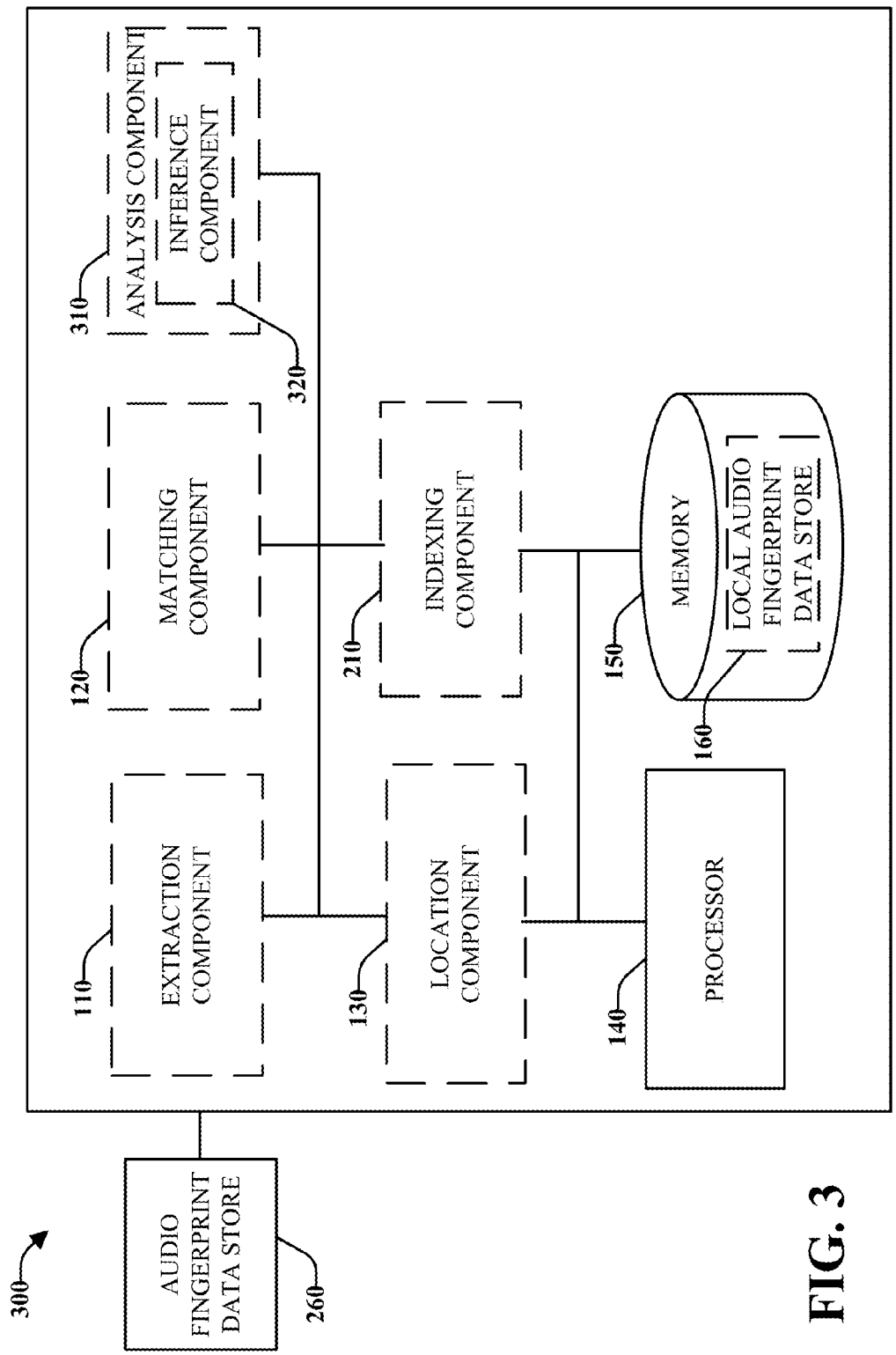
FIG. 3 illustrates an example of another non-limiting locating system that facilitates determining location via audio fingerprinting in accordance with various aspects and implementations described herein.

Referring now to FIG. 3, presented is another exemplary non-limiting embodiment of locating system 300 that facilitates determining location via audio fingerprinting in accordance with the subject disclosure. System 300 can include analysis component 310 to facilitate determining location information. In an embodiment, analysis component 310 determines a transportation system expected to be accessed in the future by a user of a device employing system 300. As a result, the location component 130 can download the sets of audio fingerprints from audio fingerprint data store 260 into local memory 160 that correspond to the transportation system likely to be accessed in the future. In another embodiment, the analysis component 310 can facilitate route planning and determining additional navigation information based on the location information.

In an embodiment, a device employing system 300 (and additional systems described herein), can choose to automatically download a set of audio fingerprints for a transportation the device is likely to encounter in the future. For example, if a user is entering a new city, the device may download the sets of audio fingerprints for the underground transportation system of the new city. According to this aspect, analysis component 310 can be configured to determine the location of a device using alternative, non-audio based methods, when a device employing system 200 is not underground.

For example, as a user enters a new city with his device, the analysis component 310 may determine that the user will likely employ the underground transportation systems of the new city. In turn, the transportation component 130 can be configured to automatically download the sets of audio fingerprints for the transportation systems the analysis component 310 determines as likely to be accessed in the future. In another aspect, the analysis component 310 may determine a user's precise location within a predetermined proximity of a specific underground transportation system. Accordingly, the analysis component 310 may apply a greater degree of accuracy to its determination that a user will likely access the specific transportation system in the future. For example, the analysis component 310 may determine when a user is located within a one mile radius of an entrance to an underground transportation system, the user will likely access the underground transportation system in the future. In turn, location component 130 can be configured to automatically download corresponding sets of audio fingerprints for the transportation the analysis component 310 determines as likely to be accessed in the future.

The analysis component 310 can employ any suitable method or means for determining location of a client device. In an aspect, the analysis component 310 can employ a global positioning system (GPS) in order to determine the location of a client device. In another aspect, the analysis component 610 can employ assisted GPS (AGPS), time based locating methods, multilateration, cellular identification and WiFi based methods or any other mobile device tracking methods.

In an embodiment, the analysis component 310 can employ an inference component 320 to facilitate making inferences or determinations in connection with determining the transportation system likely to be accessed in the future, as well as user routing information and additional navigation information. In order to provide for or aid in the numerous inferences described in this disclosure, inference component 320 can examine the entirety or a subset of data to which it is granted access and can provide for reasoning about user travel plans and associated information. Inference component 320 can be granted access to any information associated with locating system 300 (and additional system described herein), including information logged and/or monitored by system 310 (via analysis component) and stored in memory 150, as well as accessible extrinsic information. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events or data.

Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 4:
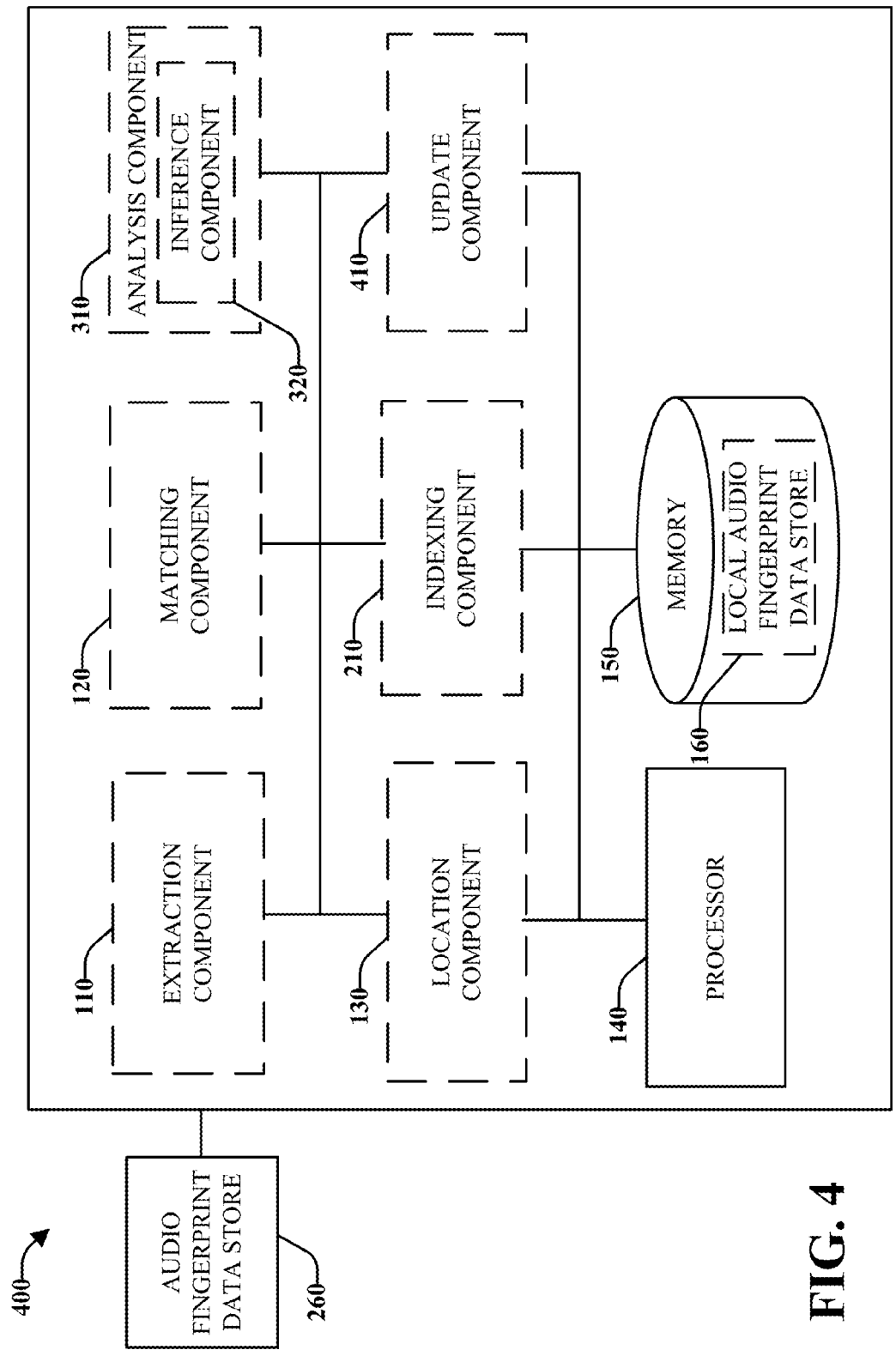
FIG. 4 illustrates an example of another non-limiting locating system that facilitates determining location via audio fingerprinting in accordance with various aspects and implementations described herein.

Referring now to FIG. 4, presented is another exemplary non-limiting embodiment of locating system 400 that facilitates determining location via audio fingerprinting in accordance with the subject disclosure. System 400 can include update component 410 to facilitate removing sets of audio fingerprints local audio fingerprint data store 160 the when the transportation systems corresponding to the sets are not expected to be accessed in the future.

For example, in addition to determining when a transportation system is likely to be accessed in the future, the analysis component 310 may also determine when a downloaded or stored set of audio fingerprints for a particular transportation system will not likely be accessed in the future. According to this aspect, the analysis component can employ GPS location information as well as gathered user travel history information to facilitate determining when a user will likely not access a particular transportation system. In turn, the update component 410 can remove the set of audio fingerprints for that transportation system from local data store 160 and free up additional memory space.

In an aspect, the analysis component 310 may be configured to determine when a user is located in a predetermined geographical region, such as a city or a state. According to this aspect, the update component may be configured to update the local data store 160 to comprise only the audio fingerprints for the transportation system located within the predetermined geographical location. For example, as a user leaves a state and enters a new state, the update component 410 may remove the audio fingerprints for the transportation system of the old state and in turn, instruct the location component 130 to download the audio fingerprints for the new state.

In another aspect, the analysis component 310 may monitor a user's travel history to determine the user's primary or home location, as well as frequently traveled locations. For example, the analysis component 310 may determine that a user who travels often for work may travel throughout several states within a certain country and reside in another state in the same country. As a result the update component 410 can be configured to not delete the audio fingerprints from local memory for the transportation systems routinely accessed by a user. Similarly, if the user goes on vacation overseas to an exotic country, the analysis component 310 may monitor the user's travel history to determine if the exotic location is going to be likely revisited in the future. For example, the analysis component 310 may determine that because the location is far away from a user's home location and has not been revisited in a year, the exotic location will likely not be re-visited in the future. Accordingly, the update component 410 can remove any downloaded audio fingerprints for transportation systems at the exotic location.

It is to be appreciated that in accordance with one or more embodiments or implementations described in this disclosure, users can opt-in or opt-out of providing personal information, demographic information, location information, proprietary information, sensitive information, or the like in connection with data gathering or monitoring aspects. Moreover, one or more embodiments or implementations described herein can provide for anonymizing collected, received, or transmitted data.

Figure 5:
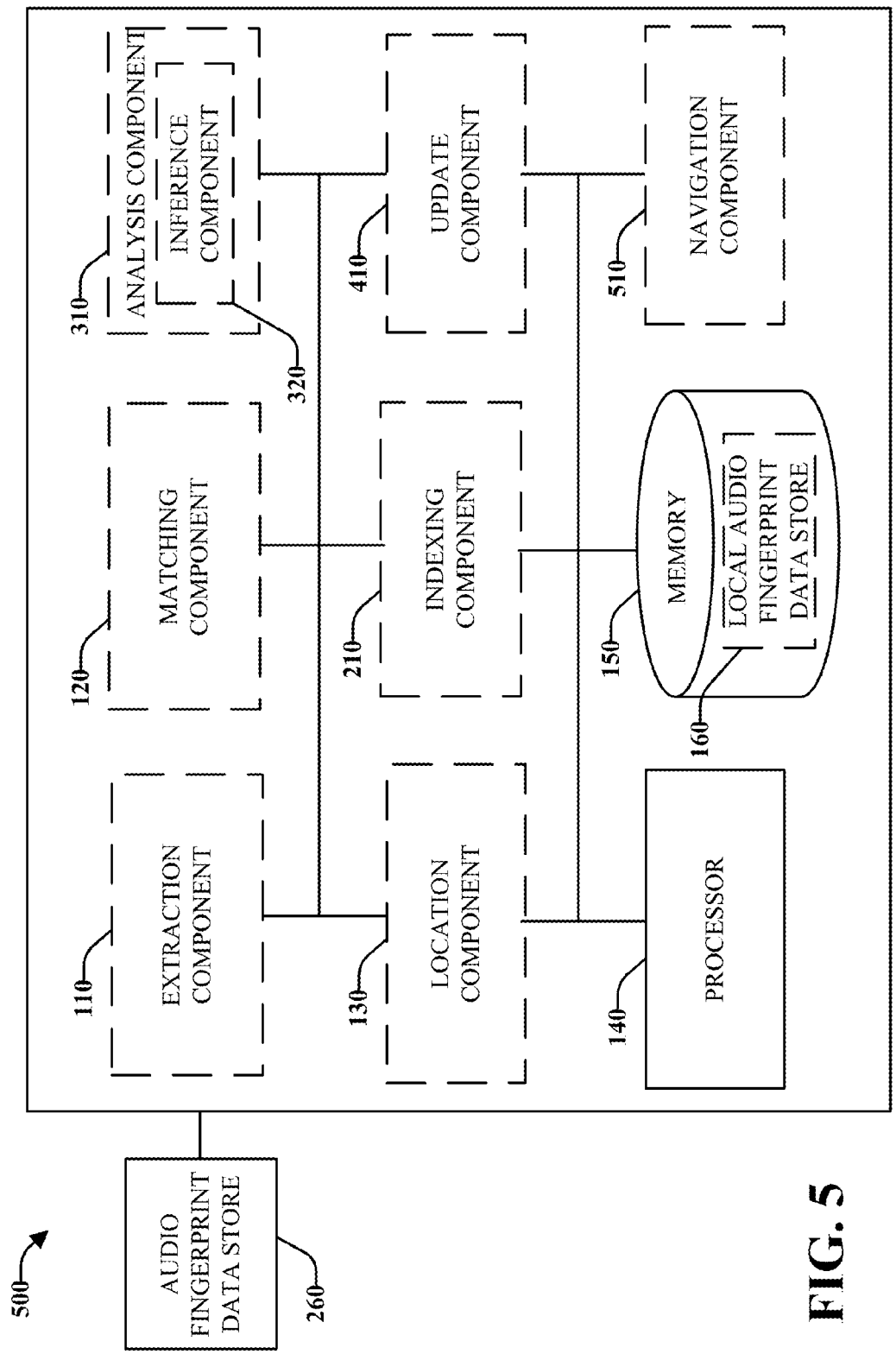
FIG. 5 illustrates an example of another non-limiting locating system that facilitates determining location via audio fingerprinting in accordance with various aspects and implementations described herein.

Referring now to FIG. 5, presented is another exemplary non-limiting embodiment of locating system 500 that facilitates determining location via audio fingerprinting in accordance with the subject disclosure. System 500 can include navigation component to facilitate providing additional navigation information and route planning based on location information. In an aspect, in addition to comprising audio fingerprints and associated location information, local audio fingerprint data store can further include additional information associated with underground transportation systems. According to this aspect, a set of audio fingerprints for a transportation system can be associated with information regarding the transportation system as a whole including but not limited to: mapping information of the transportation system below ground and the above ground features, train names and routes, train stop timetables, locations of staircases, elevators and ramps, and/or characteristics of the physical features above ground with respect to a given train stop.

According to this aspect, the navigation component 510 can employ analysis component 310 and/or inference component 320 to facilitate making additional determinations or inferences related to user travel based on determined location information. For example, where one announcement is followed by another, the navigation component 510 can determine the direction of travel and the transportation line which is being used. The navigation component 510 can further provide information regarding the time of arrival at additional stops along the way, as well as necessary return information upon exiting. For example, the navigation component, may provide a user riding the Green line which travels west, upon exit at stop 35 with a prompt that the user can return east on the red line, the last departure time of the day at stop 35 being at 10 pm. In another aspect, the navigation component can link location information to information about a stop. For example, the navigation component 510 may provide a user with a prompt with a map of the above ground physical location for a stop, and information about the above ground location such as restaurants or tourists sites. Further the navigation component 510 can provide a user with mapping information for the underground transportation system itself at a particular stop, such as relative locations of exits, hallways, elevators, and staircases. In addition, the navigation component 510 can provide a user with a timetable with information regarding transportation connections at a current stop.

Figure 7:
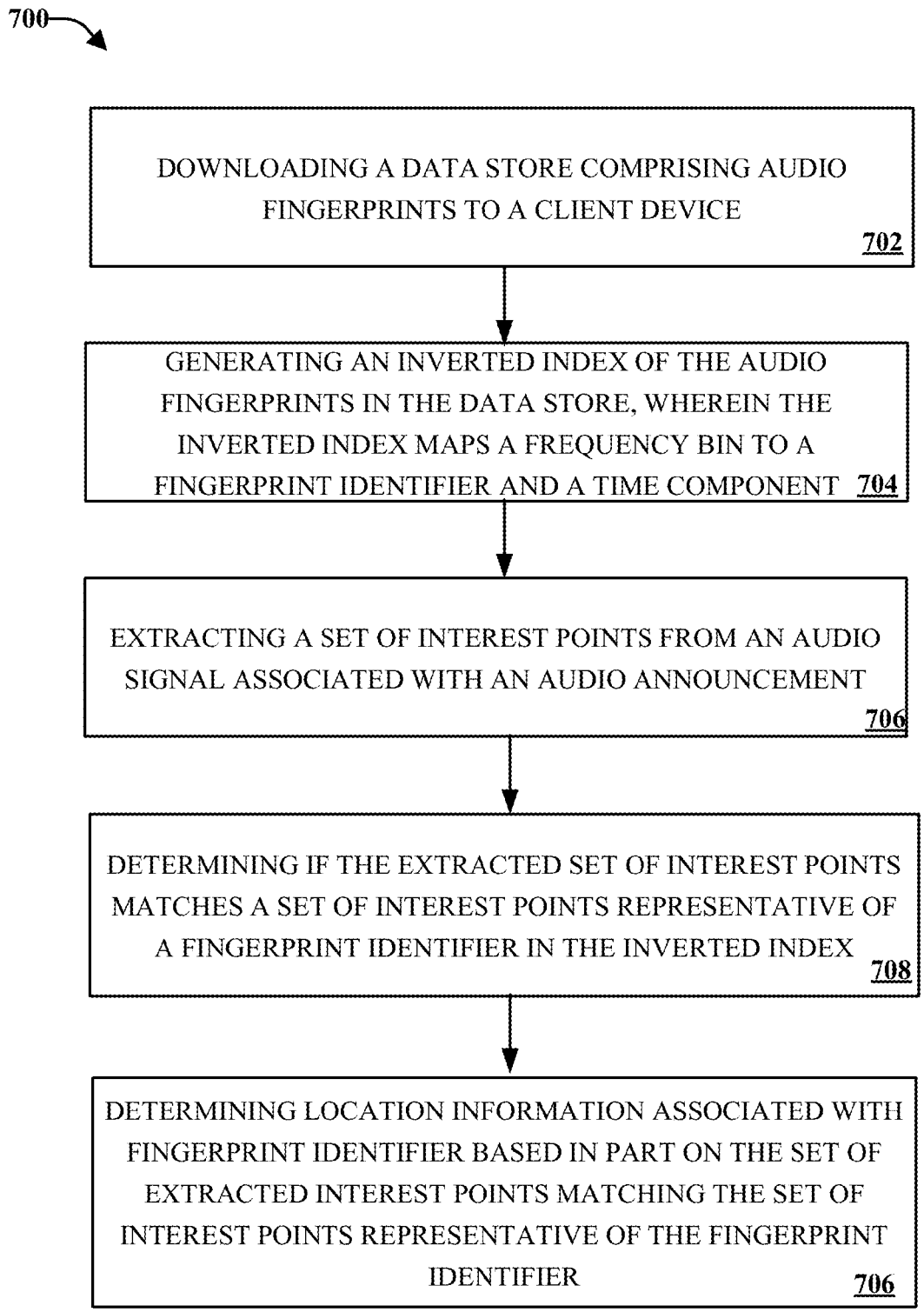
FIG. 7 illustrates an example methodology for determining location via audio fingerprinting in accordance with various aspects and implementations described herein.
Figure 8:
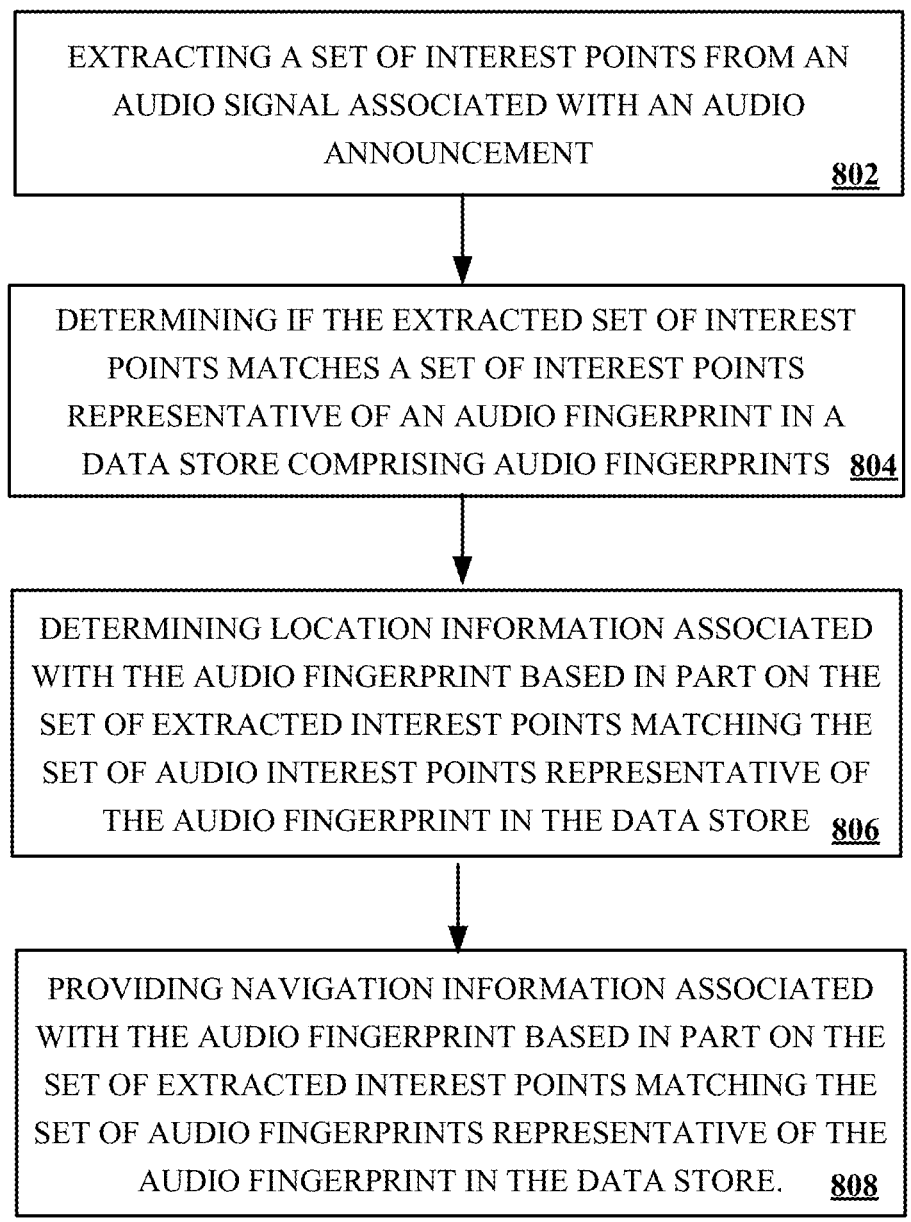
FIG. 8 illustrates an example methodology for determining location via audio fingerprinting in accordance with various aspects and implementations described herein.

FIGS. 6-8 illustrates methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, presented is a flow diagram of an example application of systems disclosed in this description accordance with an embodiment. In an aspect, exemplary methodology 600, a locating system is stored in a memory and utilizes a processor to execute computer executable instructions to perform functions. At 602 a set of interest points are extracted from an audio signal associated with an audio announcement (e.g. using extraction component 110). At 604 it is determined whether the extracted set of interest points matches a set of interest points representative of an audio fingerprint in a data store comprising audio fingerprints (e.g. using matching component 120). Then at 606, location information associated with the audio fingerprints in the audio fingerprint is determined based in part on the set of extracted interest points matching the set of audio interest points representative of the audio fingerprint in the data store (e.g. using location component 130).

Referring now to FIG. 7, presented is a flow diagram of an example application of systems disclosed in this description accordance with an embodiment. In an aspect, exemplary methodology 700, a locating system is stored in a memory and utilizes a processor to execute computer executable instructions to perform functions. At 702 a data store is downloaded to a client device, the data store comprising audio fingerprints (e.g. using location component). At 704, an inverted index of the audio fingerprints in the data store is generated, wherein the inverted index maps a frequency bin to a fingerprint identifier and a time component (e.g. using indexing component 210). At 706, a set of interest points is extracted from an audio signal associated with an audio announcement (e.g. using extraction component 110). AT 708, it is determined if the extracted set of interest points matches a set of interest points representative of a fingerprint identifier in the inverted index (e.g. using matching component). Then at 710, location information associated with the fingerprint identifier is determined based in part on the set of extracted interest points matching the set of interest points representative of the fingerprint identifier (e.g. using matching component).

Referring now to FIG. 8, presented is a flow diagram of an example application of systems disclosed in this description accordance with an embodiment. In an aspect, exemplary methodology 800, a locating system is stored in a memory and utilizes a processor to execute computer executable instructions to perform functions. At 802 a set of interest points are extracted from an audio signal associated with an audio announcement (e.g. using extraction component 110). At 804 it is determined whether the extracted set of interest points matches a set of interest points representative of an audio fingerprint in a data store comprising audio fingerprints (e.g. using matching component 120). At 806, location information associated with the audio fingerprints in the audio fingerprint is determined based in part on the set of extracted interest points matching the set of audio interest points representative of the audio fingerprint in the data store (e.g. using location component 130). Then at 808, navigation information associated with the audio fingerprints is provided based in part on the set of extracted interest points matching the set of audio fingerprints representative of the audio fingerprint in the data store.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 9:
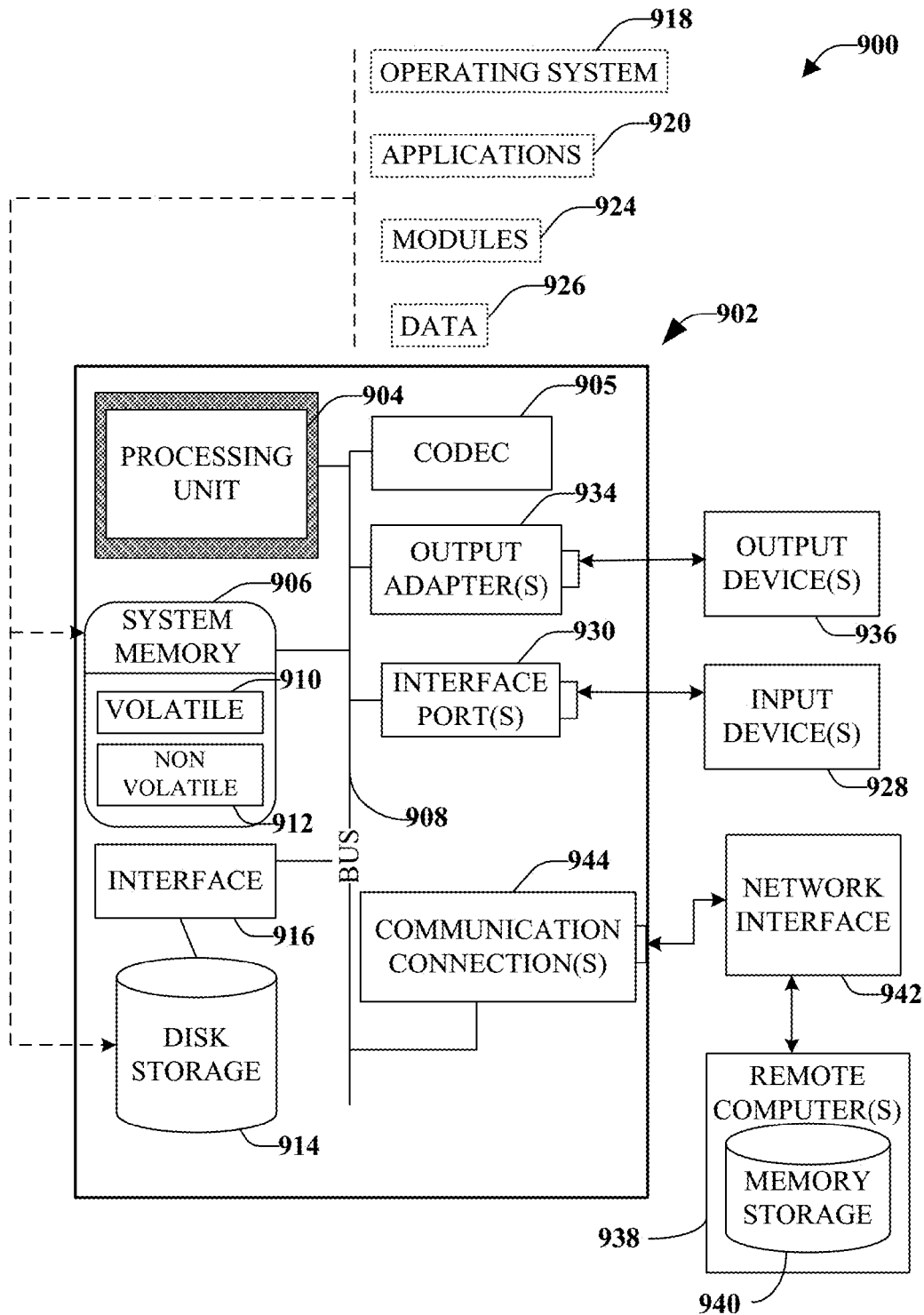
FIG. 9 is a block diagram representing an exemplary non-limiting networked environment in which various embodiments can be implemented.

With reference to FIG. 9, a suitable environment 900 for implementing various aspects of the claimed subject matter includes a computer 902. The computer 902 includes a processing unit 904, a system memory 906, a codec 905, and a system bus 908. In an aspect, processing unit 904 and system memory 906 can represent processor 140 and memory 150 respectively. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 905 may include at least one of an encoder or decoder, wherein the at least one of an encoder or decoder may consist of hardware, a combination of hardware and software, or software. Although, codec 905 is depicted as a separate component, codec 905 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-70 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918.

Operating system 918, which can be stored on disk storage 914, acts to control and allocate resources of the computer system 902. Applications 920 take advantage of the management of resources by operating system 718 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
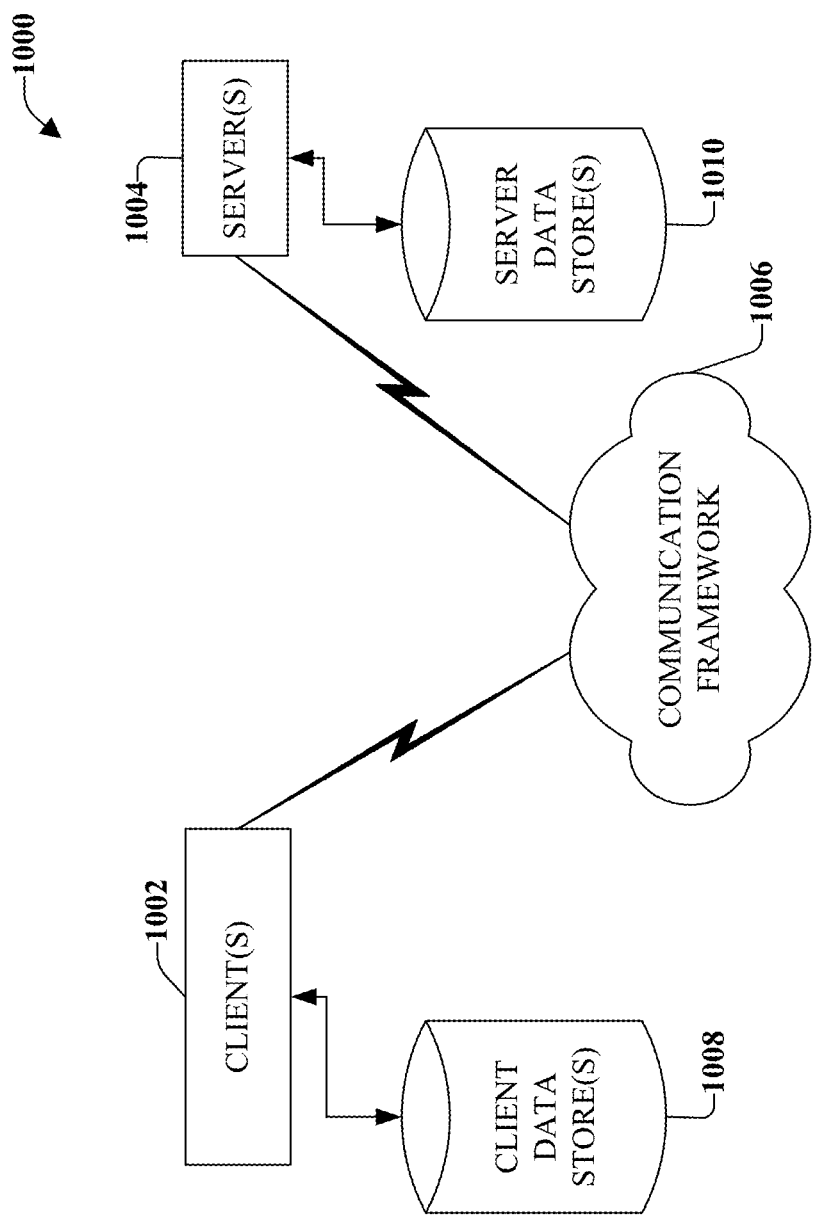
FIG. 10 is a block diagram representing an exemplary non-limiting computing system or operating environment in which various embodiments may be implemented.

Referring now to FIG. 10, there is illustrated a schematic block diagram of a computing environment 1000 in accordance with this disclosure. The system 1000 includes one or more client(s) 1002 (e.g., laptops, smart phones, PDAs, media players, computers, portable electronic devices, tablets, and the like). System 1000 can for example be employed in connection with implementing one or more of the systems or component described herein shown in FIGS. 1-5. The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include metadata, e.g., associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 include or are operatively connected to one or more client data store(s) 1008 that can be employed to store information local to the client(s) 1002 (e.g., associated contextual information). Similarly, the server(s) 1004 are operatively include or are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A device, comprising:
   a memory having stored thereon computer executable components; and
   a processor configured to execute the following computer executable components stored in the memory:
   an indexing component configured to receive reference audio fingerprints and metadata respectively associated with the reference audio fingerprints, wherein the reference audio fingerprints respectively correspond audio announcements and the metadata is respectively related to the audio announcements;
   an extraction component configured to extract interest points from an audio signal in response to detection of the audio signal by the device and compute audio fingerprints based on the interest points; and
   a matching component configured to render metadata associated with one of the reference audio fingerprints in response to a determination that one of the audio fingerprint matches the one of the reference audio fingerprints.

2. The device of claim 1, wherein the metadata respectively associated with the reference audio fingerprints comprises location information corresponding to respective locations at which the audio announcements are played.

3. The device of claim 2, further comprising a location component configured to determine a location of the device based on the metadata associated with the one of the reference audio fingerprints.

4. The device of claim 1, wherein the extraction component is configured to group the interest points into subsets of the interest points based on association with respective fixed, consecutive and overlapping windows of time over the duration of the audio signal, and compute the audio fingerprints for respective subsets of the interest points.

5. The device of claim 1, wherein the reference audio fingerprints respectively correspond to sets of reference interest points taken from respective audio samples of the audio announcements, wherein the reference interests points respectively comprise a frequency component and a time component, and wherein the indexing component is configured to generate an inverted index for the reference audio fingerprints that maps a frequency component for a reference interest point to an identifier for a reference audio fingerprint and a time component for the reference interest point.

6. The device of claim 5, wherein the matching component is configured to employ the inverted index to match the audio fingerprints to the reference audio fingerprints.

7. The device of claim 1, further comprising:
   a navigation component configured to select the reference audio fingerprints for downloading to the device based on a location of the device.

8. The device of claim 7, wherein the navigation component is further configured to select the reference audio fingerprints for downloading to the device based on historical travel patterns of the device.

9. The device of claim 1, further comprising:
   an analysis component configured to determine a transportation system expected to be accessed by a user of the device in the future based on at least one of: a location of the device, historical travel patterns of the user, or a schedule of the user; and
   a navigation component configured to select the reference audio fingerprints for downloading to the device based on the transportation system, wherein the audio announcements correspond to a set of audio announcements for the transportation system.

10. The device of claim 1, wherein the metadata respectively associated with the reference audio fingerprints comprises feature data corresponding to information about respective locations at which the audio announcements are played, including at least one of: physical structures at or near the respective locations, mechanisms for navigating about the respective locations, or characteristics of a transportation system providing transit to and from the respective locations.

11. The device of claim 10, further comprising an analysis component configured to infer at least one of: a direction a user of the device is traveling, a mechanism or characteristic of the mechanism via which the user is traveling, or a travel plan of the user, based on metadata associated with two or more two or more reference audio fingerprints corresponding to two or more audio fingerprints consecutively detected in audio signals by detection component.

12. A method comprising:
   receiving, by a mobile device comprising a processor, reference audio fingerprints and metadata respectively associated with the reference audio fingerprints, wherein the reference audio fingerprints respectively correspond audio announcements and the metadata is respectively related to the audio announcements;
   storing, by the mobile device, the reference audio fingerprints and the metadata in memory of the mobile device;
   extracting, by the mobile device, interest points from an audio signal in response to detection of the audio signal by the mobile device;
   determining audio fingerprints based on the interest points; and
   rendering metadata associated with one of the reference audio fingerprints in response to a determination that one of the audio fingerprints matches the one of the reference audio fingerprints.

13. The method of claim 12, further comprising:
   determining, by the mobile device, that a network connection is unavailable, wherein the extracting is responsive to the determining the that the network connection is unavailable.

14. The method of claim 12, wherein the metadata respectively associated with the reference audio fingerprints comprises location information corresponding to respective locations at which the audio announcements are played, the method further comprising:

determining, by the mobile device, a location of the mobile device based on the metadata associated with the one of the reference audio fingerprints.

15. The method of claim 12, wherein the determining the audio fingerprints comprises:

grouping the interest points into subsets of the interest points based on association with respective fixed, consecutive and overlapping windows of time over the duration of the audio signal; and determining the audio fingerprints for respective subsets of the interest points.

16. The method of claim 12, wherein the reference audio fingerprints respectively correspond to sets of reference interest points taken from respective audio samples of the audio announcements, wherein the reference interests points respectively comprise a frequency component and a time component, the method further comprising:

generating, by the mobile device, an inverted index for the reference audio fingerprints that maps a frequency component for a reference interest point to an identifier for a reference audio fingerprint and a time component for the reference interest point; and employing the inverted index to match the audio fingerprints to the reference audio fingerprints.

17. The method of claim 12, further comprising:

selecting, by the mobile device, the reference audio fingerprints for downloading to the mobile device based on a location of the mobile device.

18. A tangible computer-readable storage medium comprising computer-readable instructions that, in response to execution, cause a computing system to perform operations, comprising:

extracting interest points from an audio signal in response to detection of the audio signal by a device;

determining audio fingerprints based on the interest points;

comparing the audio fingerprints to reference audio fingerprints stored in memory of the device, wherein the reference audio fingerprints respectively correspond audio announcements and the reference audio fingerprints are respectively associated with metadata related to the audio announcements; and rendering metadata associated with one of the reference audio fingerprints in response to a determination, based on the comparing, that one of the audio fingerprints matches the one of the reference audio fingerprints.

19. The tangible computer-readable storage medium of claim 18, wherein the metadata respectively associated with the reference audio fingerprints comprises location information corresponding to respective locations at which the audio announcements are played, the method further comprising:

determining, by the mobile device, a location of the mobile device based on the metadata associated with the one of the reference audio fingerprints.

20. The tangible computer-readable storage medium of claim 18, wherein the metadata respectively associated with the reference audio fingerprints comprises feature data corresponding to information about respective locations at which the audio announcements are played, including at least one of: physical structures at or near the respective locations, mechanisms for navigating about the respective locations, or characteristics of a transportation system providing transit to and from the respective locations, wherein the operations further comprise:

identifying two or more audio fingerprints in consecutively detected in audio signals;

analyzing metadata associated with two or more two or more reference audio fingerprints corresponding to two or more audio fingerprints; and inferring, based on the analyzing, at least one of: a direction a user of the device is traveling, a mechanism or characteristic of the mechanism via which the user is traveling, or a travel plan of the user.

\* \* \* \* \*